US006696375B2

(12) United States Patent
Welsh et al.

(10) Patent No.: US 6,696,375 B2
(45) Date of Patent: *Feb. 24, 2004

(54) INORGANIC HYDROGEL FLATTING AGENTS

(75) Inventors: William Alan Welsh, Highland, MD (US); Stephen Raymond Schmidt, Silver Spring, MD (US)

(73) Assignee: W. R. Grace & Co.-Conn., Columbia, MD (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/485,304

(22) Filed: Jun. 7, 1995

(65) Prior Publication Data

US 2002/0077242 A1 Jun. 20, 2002

Related U.S. Application Data

(63) Continuation of application No. 08/080,436, filed on Jun. 18, 1993, now abandoned, which is a continuation of application No. 07/862,651, filed on Apr. 2, 1992, now abandoned, which is a continuation of application No. 07/604,389, filed on Oct. 26, 1990, now Pat. No. 5,110,769, which is a continuation of application No. 07/310,125, filed on Feb. 15, 1989, now abandoned.

(51) Int. Cl.$^7$ ............................................ C03C 37/04
(52) U.S. Cl. ...................................................... 501/12
(58) Field of Search ........................................... 501/12

(56) References Cited

U.S. PATENT DOCUMENTS

| | | | |
|---|---|---|---|
| 2,204,981 A | 6/1940 | Clough | 106/192 |
| 2,625,492 A | 1/1953 | Young | 106/482 |
| 2,838,413 A | 6/1958 | Young | 106/272 |
| 2,856,268 A | 10/1958 | Young | 23/182 |
| 2,858,284 A | 10/1958 | Acker et al. | 523/333 |
| 3,499,778 A | 3/1970 | Cain et al. | 106/248 |
| 3,607,337 A | 9/1971 | Offenbach et al. | 106/491 |
| 3,816,154 A | 6/1974 | Baldyga | 106/482 |
| 3,959,174 A | 5/1976 | Winyall et al. | 252/317 |
| 4,097,302 A | 6/1978 | Cohen et al. | 106/312 |
| 4,127,641 A | 11/1978 | Aldcroft et al. | 423/339 |
| 4,155,769 A | 5/1979 | Almagro | 106/193 |
| 4,216,113 A | 8/1980 | Winyall | 252/317 |
| 4,474,824 A | 10/1984 | Dewolf, II et al. | 427/2 |
| 4,595,578 A | 6/1986 | Cohen et al. | 423/338 |
| 4,619,705 A | 10/1986 | Dixon et al. | 106/288 |
| 4,758,440 A | 7/1988 | van der Heem | 426/330.4 |
| 4,847,235 A | 7/1989 | van der Heem | 502/407 |
| 5,110,769 A | * 5/1992 | Welsh et al. | 501/12 |
| 5,145,568 A | 9/1992 | Chung et al. | 204/181.7 |

OTHER PUBLICATIONS

Silica Gels: Preparations and Properties—Winyall—1984 (No Month).
Structure & Properties of Amorphous Silica Gel in Coatings Applications—Kutik—Oct. 9, 1985.
Crosfield Silicas for Surface Coatings—Crosfield Chemicals, Inc. Date unknown.
Kirk–Othmer Encyclopedia of Chemical Technology, 2nd Edition vol. 18, p. 64–66, 1969.
"New Advances in Fine Silica Technology" by S. E. Maskery presented at International Business Contact Club meeting—Mar. 24, 1976.
"Gasil WP for Matting Clear Emulsion Based Wood Finishes" Joseph Crosfield & Sons Limited—Product Literature (No Date).
Instruction Manual for Coulter Counter Model TA; 2nd Edition Dec. 1974; Coulter Electronics Limited, Coldharbour Lane, Harpenden, Hertfordshire, England.
Gasil WP for Matting Clear Emulsion Based Wood Finishes, Crosfield Silicas.
M. L. Maule and J.M Bogdanor, Grace Davison, "Matting Agents –Quality Considerations"; Surface Coatings Australia, Mar. 1994.
Sestrick et al., "Novel Silica Matting Angels for Waterborne Coatings".
BS 3406: Part 5: 1983, "British Standard Methods for Determination of Particles Size of Powders".
ASTM D 4438–85, "Standard Test Methods for Particle Size Distribution of Catalytic Material by Electronic Counting", pp. 1–4.
Maskery, Mr. S. E., "Lecture for International Business Contact Clum to be Submitted to Organiser by 1st Dec. 1975 New Advances in Fine Silica Technology" and list of attendees.

(List continued on next page.)

Primary Examiner—Elizabeth D. Wood
(74) Attorney, Agent, or Firm—William D. Bunch; Charles A. Cross

(57) ABSTRACT

An improved flatting agent comprising an inorganic hydrogel having a pore volume of at least 1.0 ml/g, an average particle size in the range 1 to 10 microns, and a particle size distribution such that when the flatting agent is dispersed in a coating, the fineness of grind is at least 4.75 on the Hegman scale. The inorganic hydrogel flatting agents of this invention are prepared by milling an inorganic hydrogel under controlled temperature conditions wherein a volatiles content of at least 40 weight percent is maintained, to produce inorganic hydrogel particles characterized by a pore volume of at least 1.0 ml/g, an average particle size in the range of 1 to 10 microns, and a particle size distribution such that when the flatting agent is dispersed in a coating, the fineness of grind is at least 4.75 on the Hegman scale. Also provided in accordance with this invention are improved coating compositions comprising a full gloss coating containing the above described flatting agents dispersed in the full gloss coating in from 3 to 15 weight percent loading on a solids basis.

9 Claims, 3 Drawing Sheets

OTHER PUBLICATIONS

Crosfield Chemicals, "Crosfield Silicas for Matting Water Based Paint and Lacquer Systems".

ASTM D 1210–79, "Standard Test Method for Fineness of Dispersion of Pigment–Vehicle Systems", pp. 220–233.

Syloid 7000, Grace Davison.

Horak et al., "The Influence of Porosity of Discrete Particles upon their Apparent Dimensions as Measured by the Coulter Principle".

Federation Series on Coatings Technology, Unit 16, Dispersion and Grinding, pp. 14–17 and 36–39.

L. C. Drake and H. L. Ritter, Ind. Eng. Chem. Anal. Ed., 17,787 (1945).

* cited by examiner

INORGANIC HYDROGEL FLATTING AGENTS

This is a continuation of application Ser. No. 08/080,436, filed Jun. 18, 1993 which is a continuation of U.S. patent application Ser. No. 07/862,651 filed Apr. 2, 1992, now abandoned which is a continuation of U.S. patent application Ser. No. 07/604,389, filed Oct. 26, 1990 now U.S. Pat. No. 5,110,769 issued May, 5, 1992 which is a continuation of U.S. patent application Ser. No. 07/310,125, filed Feb. 15, 1989, now abandoned.

BACKGROUND OF THE INVENTION

1. Field of the Invention

This invention relates to flatting agents, and more specifically to inorganic hydrogel flatting agents characterized by their high pore volumes, small particle sizes, and narrow particle size distributions.

2. Description of the Prior Art

It is known in the prior art that synthetic or natural particulate materials can be used as flatting agents in various applications such as industrial coatings, synthetic leather, plastics, printing, etc. Ideally, flatting agents should possess the following properties: high pore volume; narrow pore size distribution; appropriate particle size for the particular application; narrow particle size distribution; and maintenance of particle integrity, pore volume and particle size distribution during processing.

Because they possess most of the above properties, precipitated silicas, silica aerogels and xerogels are commonly used as flatting agents. The process for making silica aerogel or xerogel flatting agents is well known to those skilled in the art, and is represented in FIG. 1.

Under this process sodium silicate and sulfuric acid are mixed rapidly and continuously at low temperatures, low pH, and high concentrations to form a hydrosol. The hydrosol sets and undergoes a phase change to a gel-like structure known as a hydrogel. The hydrogel is broken into relatively small sections and washed to remove soluble salts and impurities. It is during this wash cycle that the pore structure of the washed hydrogel is developed. Following the wash cycle, the washed hydrogel is then dried and/or activated by thermal means to form silica gel which can then be ground or milled to a specific particle size and particle size distribution. In some cases, application of a surface treatment to provide lubricity or to improve suspension properties is also performed.

The final gel properties can be controlled by the rate and method of drying. For example, when the hydrogel is dried slowly, the pore structure collapses and results in a xerogel. Xerogels are characterized by a compressed structure, reduced pore volume and relatively high surface area. The pore volumes of flatting types of xerogels are typically around 1.1 ml/g. In contrast, when the liquid in the washed hydrogel is removed by rapid drying, by solvent extraction, azeotropes, or other similar means to reduce the surface tension of the liquid within the hydrogel pores, shrinkage is reduced, the original pore volume is substantially preserved, and an aerogel structure results. Aerogel flatting agents are therefore characterized by their higher pore volumes typically around 1.4 to 1.7 ml/g, and relatively lower surface areas.

There are certain disadvantages in using any previously existing form of silica flatting agent. As previously discussed, xerogels are characterized by their compressed structure and resultant reduced pore volume and thus exhibit reduced flatting efficiency. Aerogels, with their comparatively higher pore volume are among the most efficient flatting agents currently employed in the coatings industry. However, there are substantial capital equipment costs attributable to the water removal, drying and activation processes involved in the manufacturing of aerogel flatting agents. Precipitated silica flatting agents may have flatting efficiencies as high or higher than aerogels, but are inferior otherwise due to their friable nature in terms of maintaining suitable particle size during agitation.

SUMMARY OF THE INVENTION

An object of this invention is to provide a flatting agent with improved flatting efficiency.

Another object of this invention is to reduce the number of processing steps in making a flatting agent.

Another object of this invention is to make a flatting agent characterized by its high pore volume, small particle size and narrow particle size distribution.

Another object of this invention is to make a flatting agent, which, when dispersed into a coating vehicle, results in a coating having a fineness of grind greater than 4.75 on the Hegman scale. In accordance with the present invention, there have been provided certain novel flatting agents which comprise inorganic hydrogels having pore volumes greater than 1.0 ml/g, a particle size in the range 1-10 microns and particle size distribution such that when this inorganic hydrogel flatting agent is dispersed in a coating vehicle, the fineness of grind is at least 4.75 on a Hegman scale. The flatting agents of this invention offer an improved efficiency over the prior art materials and involve fewer processing steps than those currently used.

The flatting agents of this invention are prepared by milling an inorganic hydrogel while maintaining a volatiles content of at least 40 weight percent, to produce inorganic hydrogel particles having average particle sizes in the range 1 to 10 microns, pore volumes of at least 1.0 ml/g and a particle size distribution such that when the inorganic hydrogel flatting agent is dispersed in a coating, the fineness of grind is at least 4.75 on a Hegman scale.

Alternatively, the flatting agents of this invention may be prepared by spray-atomizing inorganic hydrosols to form small particles that polymerize to form inorganic hydrogel particles having appropriate pore volume, particle size and particle size distribution as previously defined.

Also provided in accordance with this invention are improved coating compositions comprising a full gloss coating and an inorganic hydrogel flatting agent having a pore volume of at least 1.0 ml/g, an average particle size in the range 1 to 10 microns and a particle size distribution such that when the inorganic hydrogel flatting agent is dispersed in the coating vehicle, the fineness of grind is at least 4.75 on a Hegman scale; and wherein the flatting agent is present in the coating vehicle in from 3 to 15 weight percent loading on a solids basis.

These and other objects will be apparent from the remaining specification and the appended claims.

DETAILED DESCRIPTION

Figure 1:
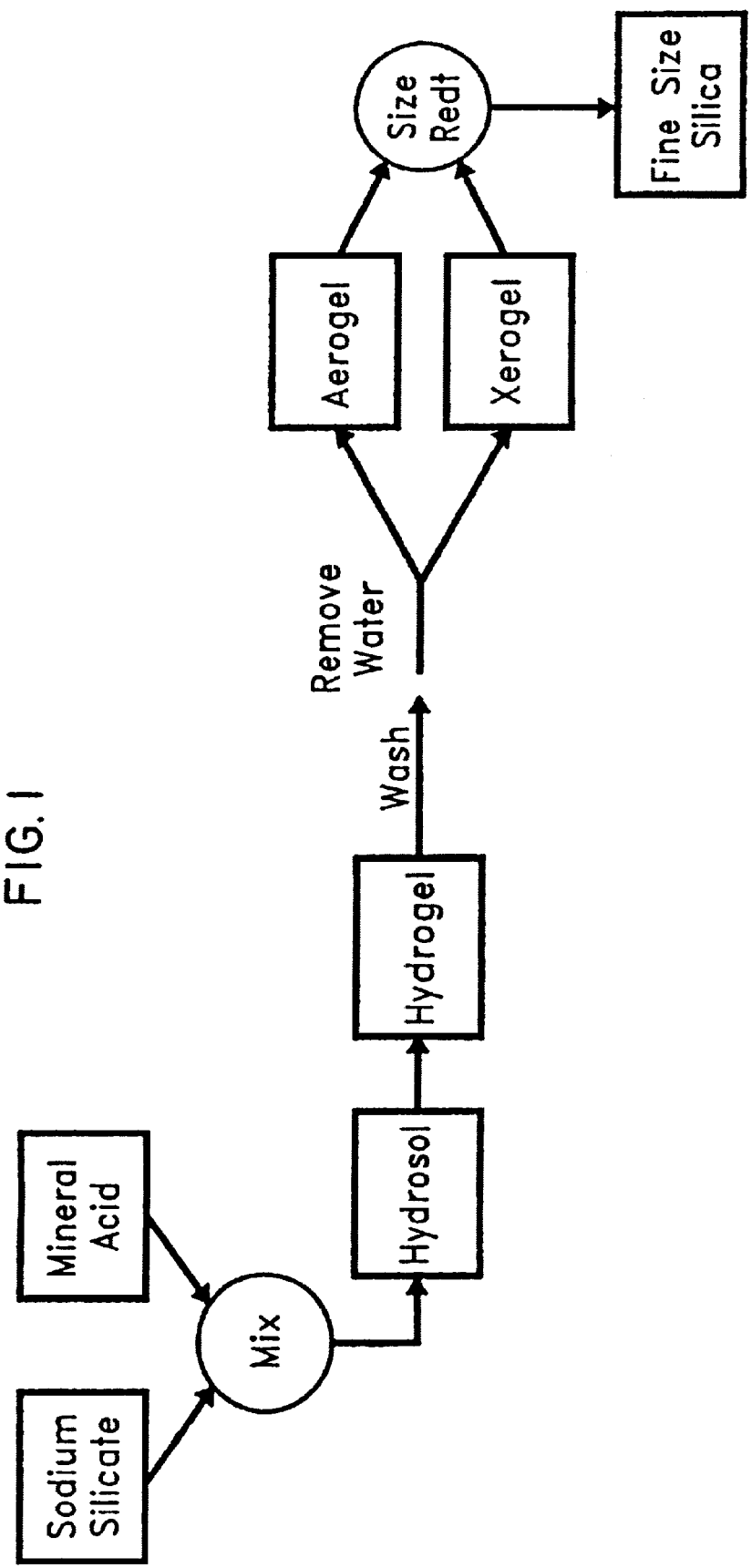
FIG. 1 represents a process for making silica aerogel or xerogel flatting agents.
Figure 2:
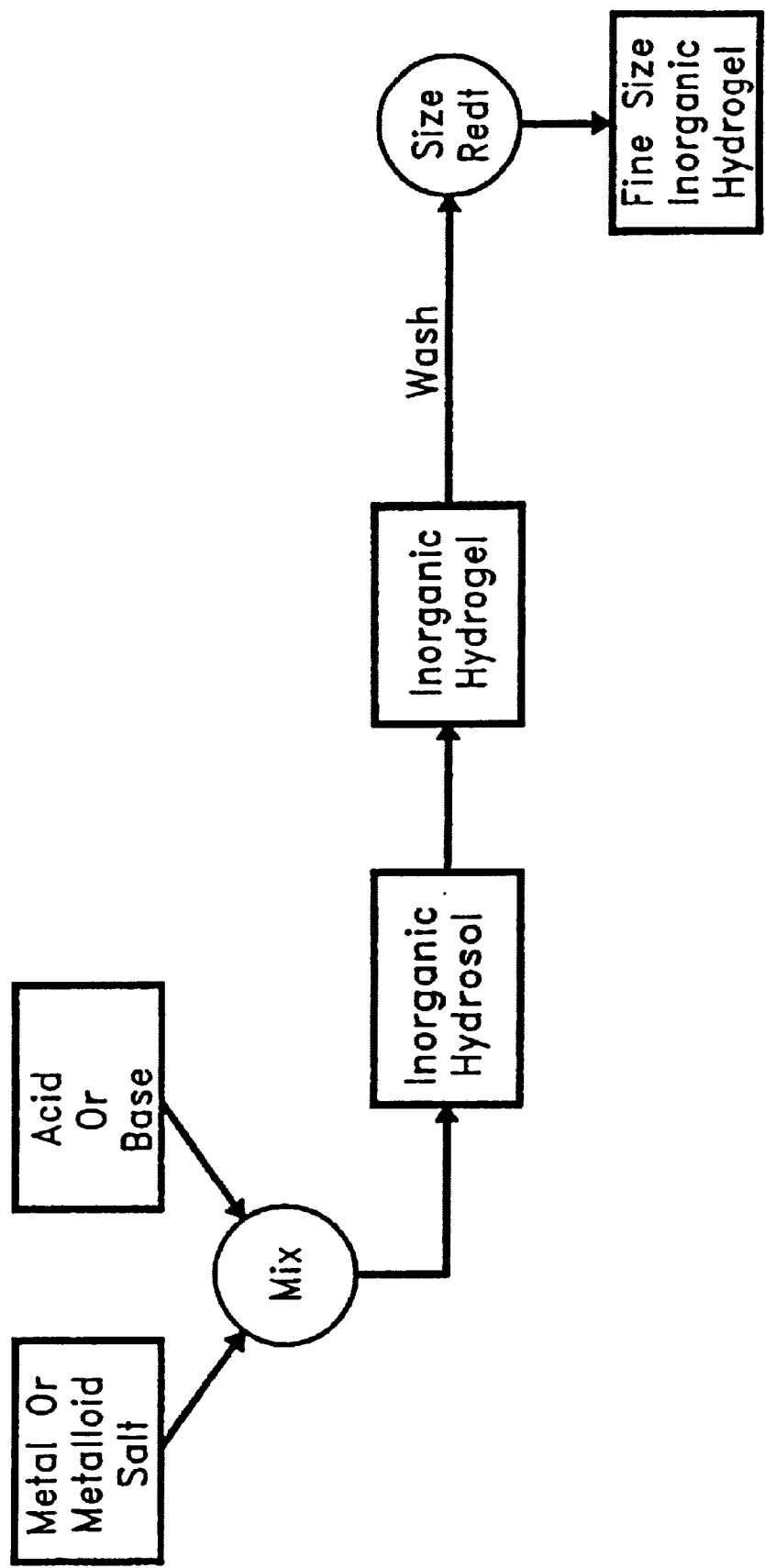
FIG. 2 represents a process for preparing inorganic hydrogel flatting agents.

The present invention is directed to forming inorganic hydrogel flatting agents having pore volumes greater than 1.0 ml/g and average particle sizes in the range of about 1 to 10 microns. These inorganic hydrogel flatting agents are prepared by milling under conditions resulting in minimal loss of volatiles content, a washed, but not dried inorganic hydrogel. (See FIG. 2.)

The inorganic hydrogel flatting agents of this invention are formed from hydrous inorganic oxides including, but not limited to silica, alumina, titania, zirconia, zircon, tin oxide, magnesia, or mixtures thereof. It is preferred to use silica, alumina or titania.

The preparation of inorganic hydrogels is well known to those skilled in the art. See for example, Iler, "The Chemistry of Silica," 462–622 (1979) or Chanakya Misra, ACS Monograph 184, "Industrial Alumina Chemicals," Chapter 2 (1986).

The general procedure to prepare inorganic hydrogels is by the neutralization of salt solutions of metals or metalloids, which, thereafter upon standing form hydrogels. The hydrogels must then be washed to remove the relatively high concentration of soluble salts. Treatment during this washing stage determines the physical properties of the final product. Hydrogel pore volumes and surface areas are dependent upon the pH and temperature of the wash solution, the rate of wash, the particle size of the hydrogel, and the duration of wash. Generally, an increase in pore volume is obtained by extending the duration of the washing periods. However, the specific washing conditions can vary depending on the particular inorganic hydrogel used, and are not per se critical to the invention, provided that adequate pore volumes are developed in the hydrogel. Those skilled in the art are intimately familiar with these washing conditions and will be readily able to determine suitable washing conditions in which to form the desired pore volumes for use in this invention.

A convenient way to produce silica hydrogels is by the acid neutralization of alkali metal silicates, which upon standing, form silica hydrogels. The silica hydrogels are then washed in an aqueous ammonia solution having a pH in the range 5 to 10 and preferably in the range 8 to 10. The silica hydrogels formed in a wash solution of the above preferred pH range are generally known in the art as "intermediate density hydrogels." It is during this washing stage that the critical pore volumes of the silica hydrogels are formed. Further, the pore volume retained upon drying a hydrogel flatting agent as part of a coating film is dependent on the type of washing employed, and in turn partly determines flatting efficiency.

Figure 3:
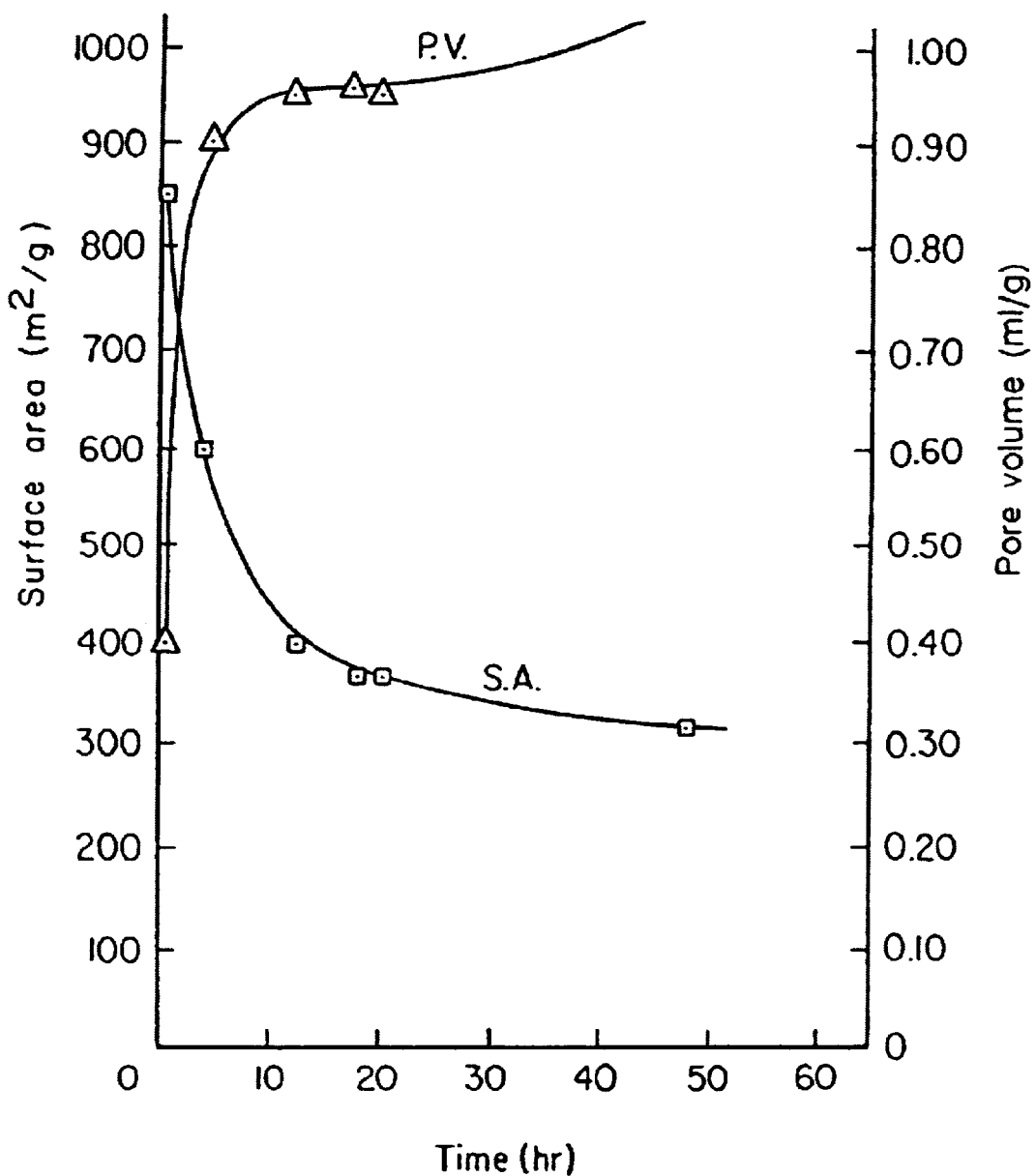
FIG. 3 illustrates the relationship between pore volume and duration of wash for silica hydrogels.

FIG. 3 illustrates the relationship between pore volume and duration of wash for silica hydrogels.

Here, a silica hydrogel is washed in an aqueous ammonia solution having a pH of 10, at 80° C. with a flow rate of 100 ml/min and illustrates the increase in pore volume with time. Since flatting efficiency is a function of pore volume, in accordance with this invention it is desirable to maximize the hydrogel pore volumes in order to achieve maximum flatting efficiency. The hydrogel flatting agents of this invention require pore volumes of at least 1.0 ml/g, which, under the conditions shown in FIG. 3, would require a wash time of at least 10 hours for silica. However, time, temperature and pH are generally interdependent. Therefore, if a temperature lower than 80° C. is used, a corresponding increase in pH or wash time would be necessary in order to develop equivalent pore volumes.

The pore volume characteristics of these hydrogels refer to the mercury pore volumes as determined by using a standard mercury porosimeter. The mercury pore volume is obtained by forcing mercury into the pores of the hydrogel. The method is well known to those skilled in the art and is described in detail by H. L. Ritter and L. C. Drake, *Ind. Eng. Chem. Anal. Ed.*, 17,787 (1945). It is important to follow certain guidelines in interpreting the mercury porosimetry data in order to obtain meaningful results. Of the two modes; intrusion (increasing applied pressure) and extrusion (decreasing pressure) only the data obtained from the intrusion mode should be used. The reported pore volume should not include any contribution from interparticle or "apparent" porosity. As pressure is increased, the mercury is forced into increasingly smaller pore diameters. By comparing the intrusion and extrusion d Vol/d log diameter vs. log Pore Diameter curves and noting a sharp rise in intrusion which has no corresponding counterpart during extrusion, one can determine the apparent pore diameter above which this interparticle porosity exists. This may occur anywhere above 3000 angstroms pore diameter.

The mercury pore volume, obtained as described above, corresponds to that fraction of the pore volume that is unoccupied by the solvent. To obtain the total pore volume, the solvent occupied pore volume, as determined by the total volatiles test (later described) is added to the mercury pore volume. Thus, the total pore volume as reported in this invention is the sum of the solvent occupied pore volume and the mercury pore volume and is measured on the final, small particle size hydrogel flatting agent.

In accordance with this invention, the washed hydrogel is then carefully milled under controlled temperature conditions to produce the appropriate particle size for use as a flatting agent. Suitable mills for use in this invention include, but are not limited to, the Air Classifying Mill (ACM) or the Fluid Energy Mill (FEM) and is preferably the Air Classifying Mill. (Use of the FEM may also involve the injection of superheated steam into the mill.) The washed hydrogel should be milled to obtain a particle size in the range 1 to 10 microns and preferably in the range 2 to 7 microns as measured by the Coulter method.

Since it is the volatiles content that preserves the large pore volumes of the hydrogel, it is important that the temperature increase of the hydrogel during the milling process be minimized. It has been discovered that the minimum volatiles content necessary to preserve the pore volume of the hydrogel be at least 40 weight percent. The volatiles content is determined by heating a hydrogel sample to a temperature sufficient to remove any volatiles within the hydrogel structure, but not so high as to vaporize the silica, usually 1750OF for one hour and measuring the total weight loss. In accordance with this invention, it is preferred to maintain a volatiles content in the range 45 to 70 weight percent.

The specific conditions employed during the milling process can vary widely depending upon the type of mill and the particular characteristics of the hydrogel used, and are not per se critical to the invention, provided that such milling conditions do not result in appreciable loss of volatiles from the hydrogel. Those skilled in the art are intimately familiar with milling procedures, and will readily be able to determine suitable milling conditions which minimize volatiles loss. Such milling conditions, as noted above, are characterized by the absence of a substantial temperature increase of the hydrogel during milling.

As used herein, the term "volatiles content" refers to any solvent contained within the pore structure of the hydrogel.

Hydrogels typically contain aqueous solvents such as the aqueous ammonia wash solution. However, it is possible to change from an aqueous solvent to a non-aqueous solvent by incorporating a series of miscible solvent changeovers, i.e., water to methanol, methanol to chloroform, chloroform to hexane, etc. The advantages of these solvent changes are to introduce solvents with lower surface tension, or to incorporate solvents that serve to improve the dispersibility of the hydrogel. At this stage it may also be appropriate to incorporate additives that serve as antibacterial, anti-fungicidal, anticorrosion, etc. agents into the pore structure of the hydrogels.

There are various methods known to those skilled in the art, as alternatives to milling the hydrogels which will also produce hydrogels of the appropriate particle size. For example, it is known in the art that inorganic hydrosols can be spray-atomized to form small particles that polymerize to form hydrogels. By carefully controlling the nozzle size and spray rate, it is possible to produce hydrogel particles in the 1 to 10 micron particle size range. The particular method selected to produce the inorganic hydrogel particles of this invention is not critical and is not intended to limit the scope of this invention.

The milled washed inorganic hydrogels of this invention can be used in various applications such as in synthetic fabrics, plastics, vinyls, printing inks, etc., but in view of their small particle sizes, they are particularly advantageous as flatting agents in industrial coatings such as Original Equipment Manufacturer (OEM) coatings including vinyl top coats, general industrial coatings such as latex and alkyd coatings, coil coatings, and clear wood finish coatings such as lacquer, varnish, and the like. Since these industrial coatings dry to form relatively thin films, the particle size of the flatting agent must be small to avoid producing irregularities in the surface. That is, while larger particles will actually improve gloss reduction, they are not suitable in demanding applications such as industrial coatings, since they produce a very rough, uneven surface and may result in loss of transparency when used in clear finishes. The most common method of determining particle size suitability within a coating is by the Hegman gauge.

The desired particle sizes of the inorganic hydrogels suitable for use in this invention are those, which when dispersed in a coating vehicle, measure at least 4.75 by the Hegman grind method. The Hegman grind method is described in ASTM Test Method D1210-9.

In evaluating coatings by the Hegman grind method, it is necessary to define the method of dispersion to be used prior to the fineness of grind measurement because the latter can depend strongly on the former, particularly with a somewhat friable flatting agent such as e.g., a precipitated silica. A range of types of dispersing equipment, of varying severity in reducing average particle size, has been used in past years for incorporating flatting agents during coatings manufacture. In order of decreasing severity of size reduction these include ball or pebble mills, sand mills, and high shear or Cowles-type mixers. The high shear mixer, employing some form of a saw-toothed blade which rotates at a peripheral speed of about 1000–5000 ft/min, is much preferred. Compared to the above methods, high shear dispersion is more convenient, less energy intensive, better for ease of changeover, allows better control of particle size (less loss of appropriately sized particles by attrition) and is more amenable to continuous processing. Therefore the general trend of the coatings industry has been toward high shear type mixing and a flatting agent which can be effectively dispersed using this method is preferred for the above reasons.

High shear dispersion of flatting agents made from gels tends only to break up oversized, weakly held agglomerates rather than to cause actual fracture of flatting-sized particles (averaging 2–7 microns) which would result in loss of flatting efficiency. Those flatting agents which are so friable as to be reduced significantly by high shear dispersion will be difficult to maintain in a suitable particle size distribution for flatting. This lack of resistance to "overgrind" results in eventual loss of flatting efficiency during extended dispersion and is undesirable.

A broad normal range for high shear dispersion parameters at the laboratory scale would include up to 5000 ft/min for peripheral speed of the mixing blade and no more than 15 minutes of mixing at or below that speed after the flatting agent had been completely added. Properly milled hydrogels such as those of this invention can meet the minimum 4.75 Hegman scale requirement following dispersion within these parameter ranges without significant loss of flatting efficiency.

A loading level of 3 percent by weight is an appropriate minimum for testing of flatting agent dispersibility for two reasons: (1) levels lower than this often do not uncover the undesirable tendency of certain flatting agents to agglomerate and produce poor Hegman results, and (2) significant gloss reduction is usually not achievable below 3%.

Without further elaboration, it is believed that one skilled in the art, using the preceding detailed description can utilize the present invention to its fullest extent.

The following examples are provided to illustrate the invention in accordance with the principles of this invention, but are not to be construed as limiting the invention in any way except as indicated in the appended claims. All parts and percentages are by weight unless otherwise indicated. Gloss and sheen levels were determined in accordance with ASTM method D-523-80.

EXAMPLE 1

This example illustrates the effective flatting properties of silica hydrogels as compared to a standard silica flatting agent, each dispersed in a water based acrylic coating vehicle.

Samples of fine-sized silica hydrogel particles were made by milling in an air classifying mill (ACM), a silica hydrogel which was prepared by the neutralization of sodium silicate followed by washing in an aqueous ammonia solution. The silica hydrogel at this stage possessed pore volumes of approximately 2.6 ml/g. The silica hydrogel samples which were fed into the ACM originally contained approximately 72% volatiles, and after milling contained approximately 45–46% volatiles, and had average particle sizes of 2.8 and 6.6 microns, respectively. This reduction in volatile content was due to a slight temperature increase during the milling process. This level of volatiles content corresponds to a pore volume of about 0.85 ml/g occupied by water. The remaining, unoccupied pore volume was determined by mercury porosimetry and was added to the volatiles occupied pore volume to obtain the totals in the table shown below. The silica hydrogel samples and a separate standard silica xerogel flatting agent, containing 5% volatiles, were dispersed respectively using a high shear dispersator at 3000 RPM for five minutes into a water-based coil coating vehicle. Each of the samples was added at 5 wt. % on a solids-only basis.

Each of the test coating samples was applied to an aluminum panel using the draw-down method with a wire-wound #40 rod. The coated panels were dried in a forced-air oven at 400° F. for two minutes. The average particle sizes were determined by the Coulter method using a 50 micron aperture. The gloss levels, which indicate the relative efficiency of materials as flatting agents were determined at a reflectance angle of 60°. The results are as follows:

| Sample | Hydrogel 1 | Hydrogel 2 | Syloid 74 - from Davison Chemical |
|---|---|---|---|
| Average Particle Size (microns) | 2.8 | 6.6 | 6.0 |
| Total Pore Volume (ml/g) | 1.9 | 2.1 | 1.3 |
| Gloss | 10.0 | 5.0 | 10.0 |

Since flatting efficiency is a function of particle size and total pore volume, the most meaningful comparison is between Hydrogel 2 and Xerogel Syloid-74, because of their similar particle sizes. As the reflectance test indicates, Hydrogel 2 is twice as efficient a flatting agent as a standard flatting pigment at the loading level.

EXAMPLE 2

Three samples of fine-sized silica hydrogel were prepared by milling a standard silica hydrogel as described in Example 1, in an ACM under conditions which resulted in the particle sizes set forth below. After milling, the hydrogel pores retained 57–58 weight percent water. The milled hydrogel samples and a separate silica xerogel flatting agent were dispersed into respective water-based thermosetting acrylic coil coating samples at 3, 5, and 7 weight percent on a solids basis. The coating was applied to aluminum panels at a nominal 0.8 mil dried film thickness using the drawdown method with a wire-wound #40 rod. The coated panels were dried in a forced air oven at 550° F. for 45 seconds. The gloss and sheen levels were determined at reflectance angles of 60° and 85° respectively. The results are as follows:

|  | Standard Xerogel | Hydrogels 3 | 4 | 5 |
|---|---|---|---|---|
| Average Particle Size (microns) | 6.9 | 6.8 | 4.6 | 5.3 |
| Total Volatiles (weight %) | 8.0 | 57.8 | 57.3 | 57.7 |
| Loading Level (weight %) | | | | |
| 3 Gloss | 42.0 | 28.2 | 28.4 | 26.0 |
| Sheen | 58.5 | 33.1 | 41.2 | 34.0 |
| 5 Gloss | 20.6 | 12.0 | 10.9 | 10.5 |
| Sheen | 27.3 | 14.2 | 12.7 | 13.0 |
| 7 Gloss | 10.2 | 6.0 | 5.9 | 5.3 |
| Sheen | 12.5 | 7.4 | 7.8 | 7.0 |

As is evident from the above results, the hydrogels have a 49% relative reduction in gloss and a 52% reduction in sheen when compared to the standard xerogel flatting agent.

EXAMPLE 3

This example illustrates the effect of flatting agent particle size on film appearance and gloss reduction when used in industrial coatings. In this example, the silica hydrogel of this invention (Hydrogel 5 from Example 2) having a total pore volume of 1.7 ml/g was compared to two commercially available silica hydrogels (Hydrogels A and B) having total pore volumes of 1.7 ml/g and 1.8 ml/g respectively. Since the total pore volumes of these hydrogels are substantially equivalent, any variations in film appearance and gloss reduction will be attributable to differences in particle size.

Samples were prepared by dispersing the silica hydrogels using 3000 RPM or about 1200 ft/min high shear mixing into respective clear thermoset wood coatings based on Rohm and Haas Rhoplex WL-92 acrylic resin. Loading levels of silica hydrogel were 3, 5 and 7 percent on a dry silica ratio, based on a total solids content of the coating system. Comparative film appearance, gloss reduction and Hegman grind values were determined and evaluated as indicated in the following table of results. A blank sample, i.e., one containing no silica hydrogel flatting agent exhibited a gloss reading of 100 and a Hegman grind value of 8.0.

| Loading Level | Hydrogel A | Hydrogel B | Hydrogel 5 |
|---|---|---|---|
| 3% Gloss | 39 | 43 | 45 |
| Hegman Grind | 4.0 | 4.5 | 6.5 |
| Surface Appearance | unacceptable | unacceptable | acceptable |
| 5% Gloss | 21 | 24 | 27 |
| Hegman Grind | 3.0 | 4.0 | 6.0 |
| Surface Appearance | unacceptable | unacceptable | acceptable |
| 7% Gloss | 14 | 15 | 19 |
| Hegman Grind | 2.0 | 3.5 | 6.5 |
| Surface Appearance | unacceptable | unacceptable | acceptable |

While the commercially available silica hydrogels, (Hydrogel A, having an average particle size of 15 microns, and Hydrogel B, having an average particle size of 12 microns) appear to have better gloss reduction than the hydrogel flatting agent of this invention (Hydrogel 5) it is apparent from the lower Hegman grind values of Hydrogels A and B, that the improved gloss reduction is due primarily to their larger particle sizes. This is confirmed by the evaluation of the dried film appearance. The coatings containing Hydrogel A and B each exhibited rough surfaces and poor transparency and were indicated above as unacceptable.

In comparison, the coating containing the hydrogel flatting agent of this invention produced a smooth surface and good transparency and was indicated above as acceptable.

EXAMPLE 4

This example illustrates the use of the hydrogels of this invention in a solvent based high solids coating vehicle. A milled silica hydrogel, prepared as in Example one, was dispersed into butyl carbitol, a water miscible solvent. This mixture was then dispersed into a polyester coating formulation (commercially available from Cargill Co. as white baking enamel Formula #P-1734-2178) at a 5 weight percent loading on a solids basis. A similar sample containing a xerogel flatting agent at a 10 weight percent loading on a solids basis was prepared for comparison. The gloss, sheen and Hegman grind values were determined. The results are as follows:

|  | Gloss (%) | Sheen (%) | Hegman Grind |
|---|---|---|---|
| Standard Xerogel | 19.2 | 45 | 5.5 |
| Hydrogel | 19.3 | 44 | 5.5 |

This example demonstrates a two-fold improvement in flatting efficiency over the standard xerogel flatting agent, since twice as much xerogel flatting agent was required to give equal gloss and sheen levels.

What is claimed is:

1. A flatting agent comprising an inorganic hydrogel having a pore volume of at least 1.0 ml/g, a volatiles content of at least 40 wt. % an average particle size in the range of 1 to 10 microns and a particle size distribution such that when the inorganic hydrogel flatting agent is dispersed in a coating vehicle, the fineness of grind is at least 4.75 on a Hegman scale.

2. The inorganic hydrogel flatting agent of claim 1, wherein the average particle size is in the range 2 to 7 microns.

3. The inorganic hydrogel flatting agent of claim 1, wherein the hydrogel is selected from silica, titania and alumina, or mixtures thereof.

4. The inorganic hydrogel flatting agent of claim 1, wherein the hydrogel is silica.

5. An improved coating composition comprising a full gloss coating and a flatting agent, said flatting agent comprising an inorganic hydrogel having a sore volume of at least 1.0 ml/g a volatiles content of at least 40 wt. %, an average particle size in the range of 1 to 10 microns and a particle size distribution such that when the inorganic hydrogel flatting agent is dispersed in a coating vehicle, the fineness of grind is at least 4.75 on a Hegman scale, wherein said flatting agent is dispersed in said full gloss coating to give a flat finish, and wherein the flatting agent is present in an amount from 3 to 15 wt. % on a solids basis.

6. The inorganic hydrogel flatting agent of claim 2 wherein said hydrogel is silica.

7. The coating composition of claim 5 wherein said inorganic oxide hydrogel is silica.

8. The coating composition of claim 5 wherein said flatting agent has an average particle size of 2–7 microns.

9. The coating composition of claim 7 wherein said flatting agent has an average particle size of 2–7 microns.

* * * * *